United States Patent Office 3,165,120
Patented Jan. 12, 1965

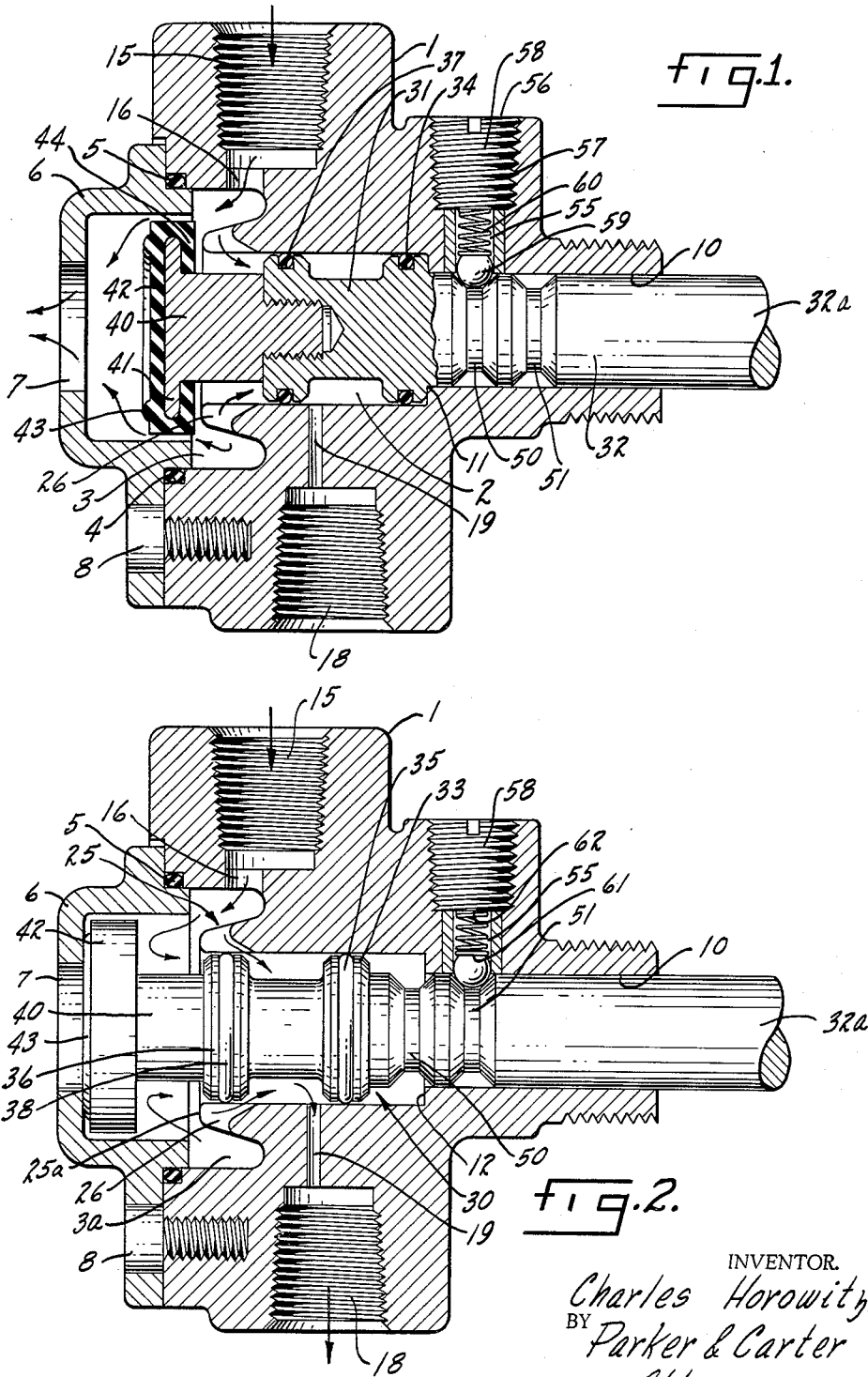

3,165,120
HAND CONTROL VALVE
Charles Horowitz, Chicago, Ill., assignor to Berg Airlectro Products Co., Chicago, Ill., a corporation of Illinois
Filed Oct. 11, 1961, Ser. No. 144,368
1 Claim. (Cl. 137—625.37)

This invention relates to valves and has particular relation to a hand control valve effective in the control of fluid pressure systems such as those employed in the brake systems of tractor-trailer combinations and like vehicles.

One purpose of the invention is to provide a positive direction of fluid pressure within a fluid pressure vehicle brake system.

Another purpose is to provide a hand control valve incorporating means for insuring the desired positioning thereof.

Another purpose is to provide a hand control fluid pressure directing valve having means for insuring alignment of parts thereof at all positions of its movable elements.

Another purpose is to provide a valve manually operable to charge a fluid pressure brake system and, alternatively, to vent the same.

Another purpose is to provide a valve structure effective to seal one escape passage while opening a second escape passage and to seal said second escape passage when said first escape passage is opened.

Another purpose is to provide a housing and valve member relatively movable and incorporating means for maintaining alignment of said valve member while directing fluid pressure thereabout.

Other purposes will appear for time to time during the course of the specification and claim.

I illustrate my invention more or less diagrammatically in the accompanying drawings, wherein:

FIGURE 1 is a side view in partial cross section and illustrating the valve member of the invention in one position; and FIGURE 2 is a side view illustrating the valve member of the invention in another position.

Like parts are indicated by like numerals throughout the specification and drawings.

Referring now to the drawings, and particularly to FIGURE 1, the numeral 1 generally designates a valve housing. A chamber 2 is formed in said housing and communicates, adjacent one of its ends, with one end of an enlarged chamber 3. The chamber 3 is open at its opposite end to atmosphere through one side of the housing and said open opposite end of chamber 3 is outwardly recessed at 4 to receive a seal member 5 clamped in said recess by a closure or cap member 6 which may be generally cup-shaped to form a continuation of chamber 3. An outlet passage which may serve as an exhaust passage is formed in the outer wall of cap 6, as indicated at 7. Any suitable connector means, such as the bolt 8, may secure the cap 6 in place on housing 1.

A reduced passage 10 is formed in housing 1 and communicates with the opposite end of chamber 2, as indicated at 11, to form an annular wall surface 12 within housing 1 at the point of communication between passage 10 and chamber 2.

A fluid pressure inlet 15 is formed in housing 1 and communicates with the chamber 3 as at 16. A fluid pressure outlet 18 is formed in housing 1 and communicates through a passage 19 with chamber 12 intermediate the ends of chamber 2.

At the point of communication between chambers 2 and 3, the enlarged chamber 3 surrounds an end portion of chamber 2, the housing 1 being formed, as indicated generally at 25, to provide for an annular portion 3a of chamber 3 surrounding the housing portion 25. The inner wall of housing portion 25 forms a continuation of the wall defining chamber 2. The lip or mouth portion 25 is slotted or otherwise opened, as indicated at 26, to provide for the passage of fluid pressure through said slots from chamber segment 3a into chamber 2. While the drawings herein illustrate two such slots or openings 26, it will be realized that a plurality of such slots or openings could be circumferentially spaced around the entire mouth segment 25 without departing from the nature and scope of the invention.

Reciprocally mounted in housing 1 is a valve member generally indicated by the numeral 30. The valve member 30 has a stem 31 of a diameter substantially less than the diameter of chamber 2. The stem 31 has a continuing portion 32 reciprocally mounted in passage 10. At the point of juncture with stem portion 32, the stem 31 carries an annular enlargement 33 which in turn has its outer circumferential surface grooved as at 34 to carry a seal 35 in sealing engagement with the inner wall of chamber 2 adjacent the juncture thereof with passage 10. Spaced along chamber 2 toward chamber 3, on stem 31, is a second annular enlargement 36 which has its outer circumferential surface similarly grooved, as at 37, to carry a seal 38 in sealing engagement with the wall of chamber 2. An extension 40 on stem 31 extends from chamber 2 into chamber 3 where an enlarged head segment 41 of extension 40 carries a valve seat or seal element 42 which may be formed of material having the properties of rubber, for example, and which has an annular ridge 43 formed on its outer end surface and dimensioned to surround the exhaust aperture 7 in cap 6 to seal the same against the escape of fluid pressure therethrough, as may be best seen in FIGURE 2. The member 42 substantially surrounds the head 41 and has a rear annular segment 44 opposed to the outer edge or edges 25a of portion or portions 25.

The stem portion 32 has spacedly and adjacently positioned thereon a pair of circumferential recesses 50, 51, the side walls of which lie in converging conical planes. Communicating with chamber 10 and laterally disposed in relation thereto is a chamber 55, the outer open end 56 of which may be threaded as at 57 and closed by plug 58. A detent 59, which may take the form of a sphere, is positioned in the opposite end of chamber 55 at the point of its communication with chamber 10 and is urged outwardly of chamber 55 toward chamber 10 by a spring 60, the opposite ends of which engage the ball 59, as at 61, and the inner end of plug 58, as at 62. It will be observed that detent 59 seats within one of the identical recesses 50 or 51, and that the depth of recesses 50, 51 is less than the diameter of detent 59 whereby detent 59 is prevented from entirely leaving chamber 55.

The use and operation of my invention are as follows:

Stem segment 32 of valve member 30 has an end portion 32a extending outwardly of housing 1 for reception of a suitable manually operating handle, or other operating element. When it is desired to direct fluid pressure entering inlet 15 outwardly of housing 1 through the outlet 7, the operator positions the valve member 30 in the position illustrated in FIGURE 1. As the parts are illustrated in the drawings, the operator thus retracts member 30, bringing groove or channel 50 into alignment with chamber 55, to receive detent 59 and bringing a rear annular surface of enlargement 33 into abutting relationship with the annular surface 12 at the rear end of chamber 2. With the parts thus in the position illustrated in FIGURE 1, fluid pressure entering inlet 15 passes through annular chamber portion 3a, about the periphery of head 41 and valve seat member 42, the diameter of the latter being less than the diameter of chamber 3 within cap 6, and thence outwardly through outlet 7. In this position, fluid pressure passes through the spaces or slots 26, but is prevented from entering outlet passages 19, 18 by the engagement of seal 38 with the wall of chamber 2 between openings 26 and passage 19. The detent 59 is effective to retain the valve member 30 in the position illustrated in FIGURE 1 against inadvertent movement.

When it is desired to direct fluid pressure entering inlet 15 through housing 1 and outwardly therefrom through outlet 18, the operator merely moves valve member 30 inwardly of housing 1, or to the left as the parts are shown in the drawings, to bring groove 51 into alignment with chamber 55. The detent 59 being rounded and the side walls of the grooves 50, 51 being inwardly conical, inward movement of member 30 causes the detent 59 to move inwardly in chamber 55 against the action of spring 60. As groove 51 moves into alignment with chamber 55, the detent 59 is urged into groove 51 by the spring 60. As best seen in FIGURE 2, the parts are dimensioned so that the valve seat 42 with its sealing ridge 43 is moved toward outlet 7 and, when the groove 51 is in alignment with chamber 55, the ridge 43 is in sealing engagement with the annular inner surface of cap 6 adjacent and surrounding the outlet 7 to seal the latter against passage of fluid pressure therethrough. As the member 30 moves inwardly of housing 1, as above described, the enlargement 36, with its seal member 38, is moved along the wall of chamber 2 into the area of the portion 25 of housing 1 and the openings 26 formed therein. When the member 30 is in the position illustrated in FIGURE 2, with the ridge 43 engaging about and sealing the outlet 7, the said member 38 is positioned intermediate the ends of the openings 26 thus, as shown by the arrows in FIGURE 2, providing communication between the annular chamber portion 3a and chamber 2 between the enlargements 33, 36 and through said portion of chamber 2 with passages 19, 18. Thus, the portion 25, with its plurality of circumferentially spaced openings 26, may be considered as a group of fingers serving to retain and guide the enlargement 36 and seal 38 in their excursion outwardly of the main segment of chamber 2 wherein the walls are solid, except for the communication of passage 19. Thus, the member 30 is retained in the desired alignment with chambers 2 and 3, even though the member 42 has no engagement with the walls of chamber 3 and even though enlargement 36 is moved a distance sufficient to provide communication with the chamber segment 3a. Thus, the member 30, which may be considered as a triple-headed valve member, has at one of its ends a head, including a valve seat, intermediate its ends a valve seal member movable to close or expose an outlet passage 19, 18 and, beyond the movable valve seal, in spaced relationship therewith, a second seal member movable within housing chamber 2 and effective to seal the same against the unintended escape of pressure therefrom. The remaining portion of the stem of valve member 30 is employed in association with detent mechanism 59, 60 to serve as a manually controllable locking means.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

A valve comprising a housing, a first chamber in said housing, a second chamber in said housing communicating with one end portion of said first chamber and having an annular portion surrounding said portion of said first chamber adjacent the point of communication therebetween, a fluid pressure inlet formed in said housing and communicating with said annular chamber portion, a fluid pressure outlet formed in said housing and communicating with said first chamber intermediate the ends thereof and spaced from said point of communication between said chambers, a second outlet formed in said housing and communicating with said second chamber, the wall of said first chamber having openings formed therein adjacent the point of communication between said chambers and providing for communication between said annular chamber portion and said first chamber, a valve member reciprocally mounted in said housing, said member comprising an elongated stem, an enlarged head adjacent one end of said stem and mounted for reciprocation within said second chamber, a valve seat element carried by said head and positioned for sealing engagement with said housing to seal said second outlet against the passage of fluid pressure outwardly therethrough when said valve member is in a first position, a second head spaced on said stem from said first head and mounted for reciprocation within said first chamber, a first seal member carried by said second head in engagement with the wall of said first chamber at all positions of said valve member, said second head being positioned between said openings in said chamber wall and said first-named outlet passage in a second position of said valve, said second head being positioned beyond at least a portion of said openings in said chamber wall in said first position of said valve to provide communication between said housing inlet and said first-named outlet through said annular chamber portion, said openings, and said first chamber, a third head on said stem, said third head being spaced on said stem from said second head and carrying a seal in contact with the wall of said first chamber between said first outlet and the opposite end of said first chamber, a passage communicating with said opposite chamber end and having a diameter less than said first chamber whereby an annular abutment surface is formed at said opposite chamber end, said third head engaging said abutment surface when said valve is in said second position, said valve member having a stem portion extending outwardly of said housing and slidable in said passage, a pair of grooves spaced on said stem portion, a detent yieldingly urged toward said stem and positioned to alternately engage said grooves when said valve member is in said first and second positions.

References Cited in the file of this patent

UNITED STATES PATENTS

| 369,528 | Kaiser | Sept. 6, 1887 |
| 2,583,539 | Bashark et al. | Jan. 29, 1952 |
| 2,793,657 | McCullough | May 28, 1957 |

FOREIGN PATENTS

| 313,653 | Great Britain | June 17, 1929 |